(12) United States Patent
Hudson et al.

(10) Patent No.: US 8,319,813 B2
(45) Date of Patent: Nov. 27, 2012

(54) MOUNTING ASSEMBLY FOR REFLECTION MIRROR IN LASER SCANNING UNIT

(75) Inventors: Randall Lee Hudson, Lexington, KY (US); Louis Anthony Wantland, Lexington, KY (US)

(73) Assignee: Lexmark International Inc., Lexington, KY (US)

( * ) Notice: Subject to any disclaimer, the term of this patent is extended or adjusted under 35 U.S.C. 154(b) by 442 days.

(21) Appl. No.: 12/534,185

(22) Filed: Aug. 3, 2009

(65) Prior Publication Data

US 2011/0025815 A1 Feb. 3, 2011

(51) Int. Cl.
*B41J 15/14* (2006.01)
*B41J 27/00* (2006.01)

(52) U.S. Cl. .................. 347/242; 347/257

(58) Field of Classification Search .......... 347/241–245, 347/256–261, 263, 231
See application file for complete search history.

(56) References Cited

U.S. PATENT DOCUMENTS

| 5,390,051 | A  | * | 2/1995  | Saito et al. ............... 359/872 |
| 5,737,346 | A  | * | 4/1998  | Stenstrom ................. 372/21 |
| 5,963,240 | A  | * | 10/1999 | Shinohara et al. .......... 347/116 |
| 6,582,089 | B2 | * | 6/2003  | Chee ....................... 359/872 |
| 6,686,588 | B1 | * | 2/2004  | Webster et al. ............ 250/239 |
| 7,453,487 | B2 | * | 11/2008 | Sato et al. ................. 347/257 |
| 7,760,410 | B2 | * | 7/2010  | Kim ........................ 359/221.2 |

FOREIGN PATENT DOCUMENTS

JP 03057173 A * 3/1991

* cited by examiner

*Primary Examiner* — Hai C Pham

(57) ABSTRACT

A mounting assembly, for mounting a reflection mirror within a laser scanning unit, includes a mounting structure, and a pair of urging members. The mounting structure includes a base member, and a first pair of support protrusions and a second pair of support protrusions configured on the base member. Each of the first pair of support protrusions and the second pair of support protrusions includes a first support protrusion having a first top surface, and a second support protrusion having a second top surface. The first support protrusion is capable of supporting an end portion of the reflection mirror on the first top surface. Each urging member of the pair of urging members is adapted to be secured over the second top surface of the second support protrusion for urging the end portion of the reflection mirror on the first support protrusion.

25 Claims, 5 Drawing Sheets

MOUNTING ASSEMBLY FOR REFLECTION MIRROR IN LASER SCANNING UNIT

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure generally relates to laser scanning units, and more particularly, to a mounting assembly for mounting a reflection mirror within a laser scanning unit, such that the reflection mirror reflects a laser beam emitted from a laser source on a photoconductive medium.

2. Description of the Related Art

In a conventional laser scanning unit employed in a laser beam printer, a scanned laser beam is deflected by a reflection mirror, in order to be incident onto a photoconductive medium. The conventional laser scanning unit may be a multi-beam laser scanning unit that includes one or more reflection mirrors mounted at different angles to precisely deflect the laser beam onto the photoconductive medium.

In general, a reflection mirror is secured at a particular angle on a housing structure within the conventional laser scanning unit by using conventional metal fittings, such as clips. Specifically, end portions of the reflection mirror are fixed on the housing structure by the conventional metal fittings screwed to within the housing structure. Further, securing of the reflection mirror at the particular angle on the housing structure using the conventional metal fittings involves a multiplicity of operation steps. For example, these include a setting of the reflection mirror on the housing structure, and setting at least two metal fittings that support the end portions of the reflection mirror for setting the reflection mirror on the mounting structure at the particular angle. Moreover, adjustment of the reflection mirror on the housing structure may be required in order to properly position the reflection mirror on the housing structure. Accordingly, securing the reflection mirror on the housing structure using such a conventional technique involving a multiplicity of operation steps may be time-consuming and user-unfriendly.

As described above, the one or more reflection mirrors employed in the conventional laser scanning unit may be secured at different angles for accurately reflecting the scanned laser beam in the direction of the photoconductive medium. For example, the one or more reflection mirrors may be secured at angles ranging from about zero degrees to about 90 degrees. Further, each of the one or more reflection mirrors may be secured on a housing structure with the help of the conventional metal fittings. However, a metal fitting that needs to be used for securing a particular reflection mirror is selected depending on the angle at which the reflection mirror is to be mounted on a housing structure. For example, a metal fitting for securing a reflection mirror that needs to be mounted at an angle of about 10 degrees may be structurally and configurationally different from a metal fitting utilized for securing a reflection mirror that needs to be mounted at an angle of about 45 degrees. Accordingly, various types of the metal fittings are required for securing the one or more reflection mirrors at different angles on respective housing structures.

Furthermore, a reflection mirror to be mounted within the conventional laser scanning unit may deflect from a reference line during fixing of the conventional metal fittings. As a result, an inaccurate deflection of the scanned laser beam onto the photoconductive medium may occur. Moreover, disassembling of the conventional metal fittings after fixing for securing the reflection mirror may be cumbersome for a user. For example, the user may need to utilize additional tools, such as lifters, to disassemble the conventional metal fittings. Additionally, use of such tools for disassembling requires extra caution, in order to avoid damage to the one or more reflection mirrors.

Accordingly, there is a need for mounting of one or more reflection mirrors within a laser scanning unit in an effective and easy-to-use manner. Further, there is a need to preclude use of various types of metal fittings for accurately securing the one or more reflection mirrors at different angles within the laser scanning unit. Furthermore, there is a need to preclude deflection of the one or more reflection mirrors while securing the one or more reflection mirrors within the laser scanning unit. Moreover, there is a need to preclude use of additional tools for dismounting the one or more reflection mirrors from within the laser scanning unit.

SUMMARY OF THE DISCLOSURE

In view of the foregoing disadvantages inherent in the prior art, the general purpose of the present disclosure is to provide a mounting assembly for mounting a reflection mirror within a laser scanning unit, to include all the advantages of the prior art, and to overcome the drawbacks inherent therein.

The present disclosure provides a mounting assembly for mounting a reflection mirror within a laser scanning unit. The mounting assembly includes a mounting structure, and a pair of urging members. The mounting structure is disposed on a portion within the laser scanning unit. The mounting structure includes a base member, a first pair of support protrusions, and a second pair of support protrusions. The first pair of support protrusions is disposed on the base member, and the second pair of support protrusions is disposed opposite to the first pair of support protrusions on the base member. Each of the first pair of support protrusions and the second pair of support protrusions extends upwardly from the base member. Each of the first pair of support protrusions and the second pair of support protrusions includes a first support protrusion having a first top surface, and a second support protrusion having a second top surface. The second support protrusion is positioned adjacent to the first support protrusion. The first top surface and the second top surface are disposed at substantially the same predetermined angle. Further, the first support protrusion is capable of supporting an end portion of the reflection mirror on the first top surface.

Each urging member of the pair of urging members is adapted to be secured over the second top surface of the second support protrusion of each of the first pair of support protrusions and the second pair of support protrusions. Further, each urging member of the pair of urging members is adapted for urging the end portion of the reflection mirror on the first support protrusion of each of the first pair of support protrusions and the second pair of support protrusions, such that at least one portion of each urging member is positioned substantially parallel to the reflection mirror.

BRIEF DESCRIPTION OF THE DRAWINGS

The above-mentioned and other features and advantages of this disclosure, and the manner of attaining them, will become more apparent and the disclosure will be better understood by reference to the following description of embodiments of the disclosure taken in conjunction with the accompanying drawings, wherein.

DETAILED DESCRIPTION

It is to be understood that various omissions and substitutions of equivalents are contemplated as circumstances may suggest or render expedient, but these are intended to cover the application or implementation without departing from the spirit or scope of the claims of the present disclosure. It is to be understood that the present disclosure is not limited in its application to the details of components set forth in the following description. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the terms "a" and "an" herein do not denote a limitation of quantity, but rather denote the presence of at least one of the referenced item. Unless limited otherwise, the terms "coupled," and "mounted," and variations thereof herein are used broadly and encompass direct and indirect couplings, and mountings. Furthermore, the use of "coupled" and variations thereof herein does not denote a limitation to the arrangement of two components.

The present disclosure provides a mounting assembly utilized in a laser scanning unit of a laser beam printer, for mounting a reflection mirror to deflect a scanned laser beam from a laser source, such that the scanned laser beam is incident on a photoconductive medium. More specifically, the mounting assembly is capable of mounting the reflection mirror within the laser scanning unit at a particular angle in an effective and easy-to-use manner. Further, the mounting assembly enables an easy dismounting of the reflection mirror from within the laser scanning unit without involving use of any additional tools, such as lifters. The mounting assembly of the present disclosure is explained in detail in conjunction with FIGS. 1 to 5.

Figure 1:
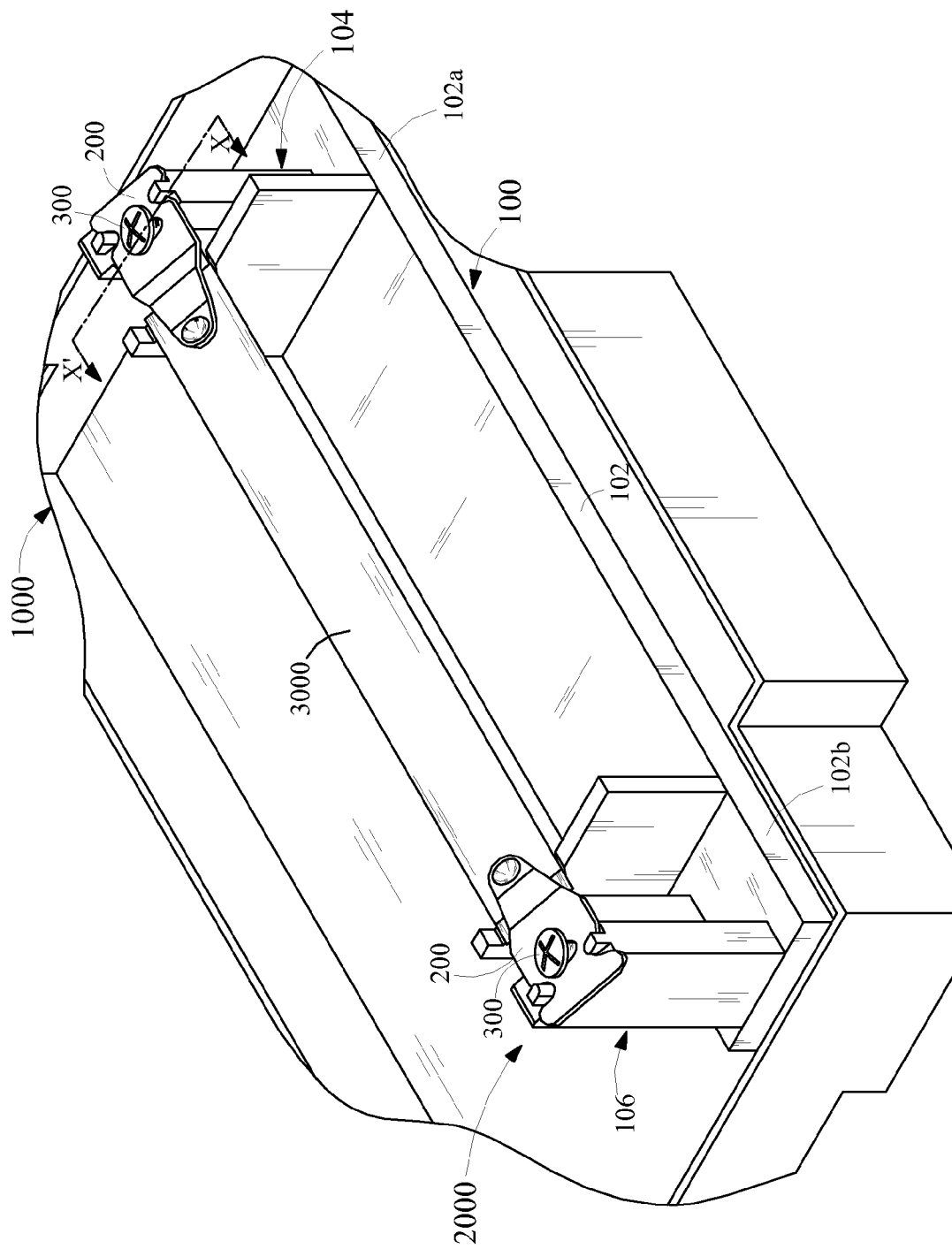
FIG. 1 depicts a perspective view of a portion of a laser scanning unit of an image forming device having a mounting assembly disposed thereon, according to an exemplary embodiment of the present disclosure.

FIG. 1 depicts a perspective view of a portion 1000 of a laser scanning unit having a mounting assembly 2000 disposed thereon, according to an embodiment of the present disclosure. The laser scanning unit may be a multi-beam laser scanning unit and may be employed in a laser beam printer.

Mounting assembly 2000 of the present disclosure is capable of mounting a reflection mirror 3000 within the laser scanning unit. Mounting assembly 2000 includes a mounting structure 100 and a pair of urging members 200. Mounting structure 100 is disposed on portion 1000 within the laser scanning unit, as depicted in FIG. 1. Reflection mirror 3000 is supported over mounting structure 100.

A pair of urging members 200 is adapted to be secured over mounting structure 100 for urging reflection mirror 3000 onto mounting structure 100. Specifically, the pair of urging members 200 is adapted to be secured on mounting structure 100 via a pair of screw members 300 for urging reflection mirror 3000 onto mounting structure 100. Reflection mirror 3000, when mounted onto mounting structure 100 using the pair of urging members 200 and the pair of screw members 300, is capable of deflecting a scanned laser beam from a laser source (not shown) of the laser scanning unit, such that the scanned laser beam is incident onto a photoconductive medium (not shown) of the laser beam printer.

Figure 2:
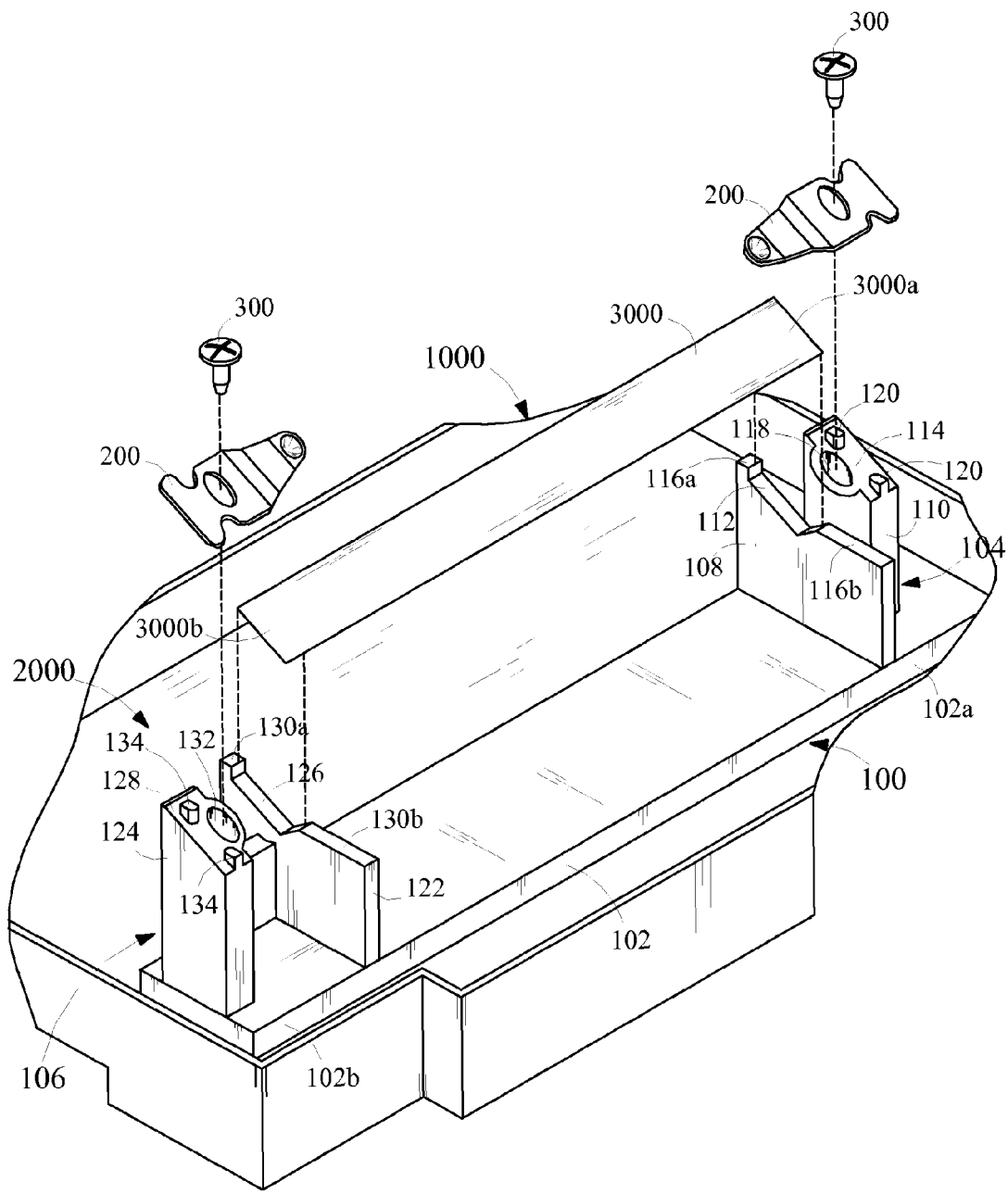
FIG. 2 depicts an exploded perspective view of the mounting assembly of FIG. 1, according to an exemplary embodiment of the present disclosure.
Figure 3:
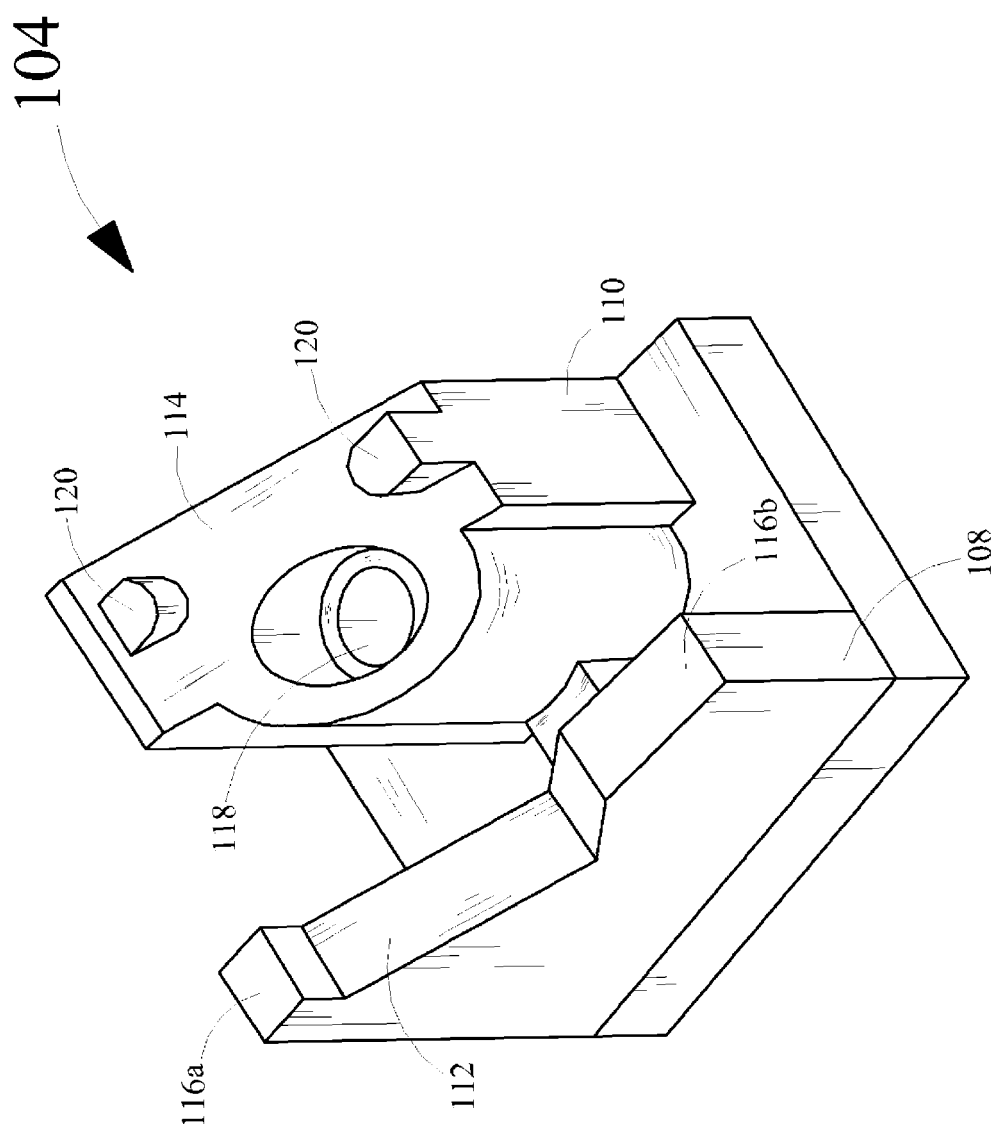
FIG. 3 depicts a perspective view of a portion of a mounting structure of the mounting assembly of FIG. 1, according to an exemplary embodiment of the present disclosure.

To describe mounting assembly 2000, reference will also be made to FIGS. 2 and 3, wherein FIG. 2 depicts an exploded perspective view of mounting assembly 2000, and FIG. 3 depicts a portion of mounting structure 100 of mounting assembly 2000.

As depicted in FIGS. 1 and 2, mounting structure 100 includes a base member 102, a first pair of support protrusions 104, and a second pair of support protrusions 106. First pair of support protrusions 104 is disposed at a first end portion 102a of base member 102. Second pair of support protrusions 106 is disposed at a second end portion 102b of base member 102, opposite to first pair of support protrusions 104 on base member 102. Specifically, first pair of support protrusions 104 and second pair of support protrusions 106 extend upwardly from first end portion 102a and second end portion 102b of base member 102, respectively. In the present embodiment of the disclosure, base member 102 has a flat surface (as depicted in FIGS. 1 and 2). Without departing from the scope of the present disclosure, base member 102 may have any other type of surface, for example an inclined surface.

First pair of support protrusions 104 includes a first support protrusion 108 and a second support protrusion 110 (as depicted in FIGS. 2 and 3). First support protrusion 108 includes a first top surface 112, and second support protrusion 110 includes a second top surface 114. First top surface 112 and second top surface 114 are disposed at a predetermined angle with respect to the flat surface of base member 102. For the purpose of the description, the predetermined angle of first top surface 112 and second top surface 114 may range from about zero degree to about 90 degrees with respect to the flat surface of base member 102 from which support protrusion pairs 104, 106 extend. In an exemplary embodiment of the invention disclosure, first top surface 112 and second top surface 114 lie in substantially parallel planes.

First top surface 112 is capable of supporting a portion of reflection mirror 3000 thereon. Specifically, first top surface 112 is capable of supporting an end portion 3000a (as shown in FIGS. 1 and 2) of reflection mirror 3000 thereon. Further, first support protrusion 108 includes barricading members 116a and 116b. Barricading members 116a and 116b are positioned at opposite top end portions (not numbered) of first support protrusion 108. Barricading members 116a and 116b enable end portion 3000a of reflection mirror 3000 to be secured onto first top surface 112 without causing any slipping and/or falling of end portion 3000a of reflection mirror 3000 from first top surface 112.

Second support protrusion 110 of first pair of support protrusions 104 includes a cut-away area 118 and a pair of rotation control features 120 (hereinafter referred to as "control features 120"). Cut-away area 118 is configured on second top surface 114 and extends vertically downwardly from second top surface 114 to a portion within second support protrusion 110. In the present embodiment, cut-away area 118 is a circular hole capable of receiving a screw member 300. Further, control features 120 of second support protrusion 110 are disposed on second top surface 114 of second support protrusion 110. Specifically, control features 120 are protrusions disposed on second top surface 114 in a manner, such that cut-away area 118 lies adjacent and between control features 120. Control features 120 enable an urging member 200 to be secured over mounting structure 100.

Similar to first pair of support protrusions 104, second pair of support protrusions 106 includes a first support protrusion 122 and a second support protrusion 124. First support protrusion 122 includes a first top surface 126, and second support protrusion 124 includes a second top surface 128. First top surface 126 and second top surface 128 are disposed at a predetermined angle, which is substantially equal to the predetermined angle at which first top surface 112 and second top surface 114 are disposed.

Further, similar to first top surface 112 of first support protrusion 108, first top surface 126 is capable of supporting a portion of reflection mirror 3000 thereon. Specifically, first top surface 126 is capable of supporting an end portion 3000b (as shown in FIGS. 1 and 2), opposite to end portion 3000a, of reflection mirror 3000 thereon. Further, first support protrusion 122 is structurally and configurationally similar to first support protrusion 108, and accordingly, first support protrusion 122 includes barricading members 130a and 130b for enabling end portion 3000b of reflection mirror 3000 to be secured onto first top surface 126 without causing slipping and/or falling of end portion 3000b of reflection mirror 3000 from first top surface 126.

Furthermore, similar to second support protrusion 110 of first pair of support protrusions 104, second support protrusion 124 of second pair of support protrusions 106 includes a cut-away area 132 and a pair of rotation control features 134 (hereinafter referred to as "control features 134"). Cut-away area 132 and control features 134 are configured on second top surface 128 of second support protrusion 124 in a manner similar to that in which cut-away area 118 and control features 120 are configured on second top surface 114 of second support protrusion 110. In an exemplary embodiment of the present disclosure, first top surface 126 and second top surface 128 lie in substantially parallel planes.

Further, cut-away area 132 is configurationally similar to cut-away area 118, and accordingly, cut-away area 132 is a circular hole capable of receiving another screw member 300. Furthermore, control features 134 are similar to control features 120, such that cut-away area 132 lies adjacent and between control features 134, in a manner similar to that of cut-away area 118. In addition, control features 134 enable another urging member 200 to be secured over mounting structure 100, in a manner similar to that of control features 120.

Figure 4:
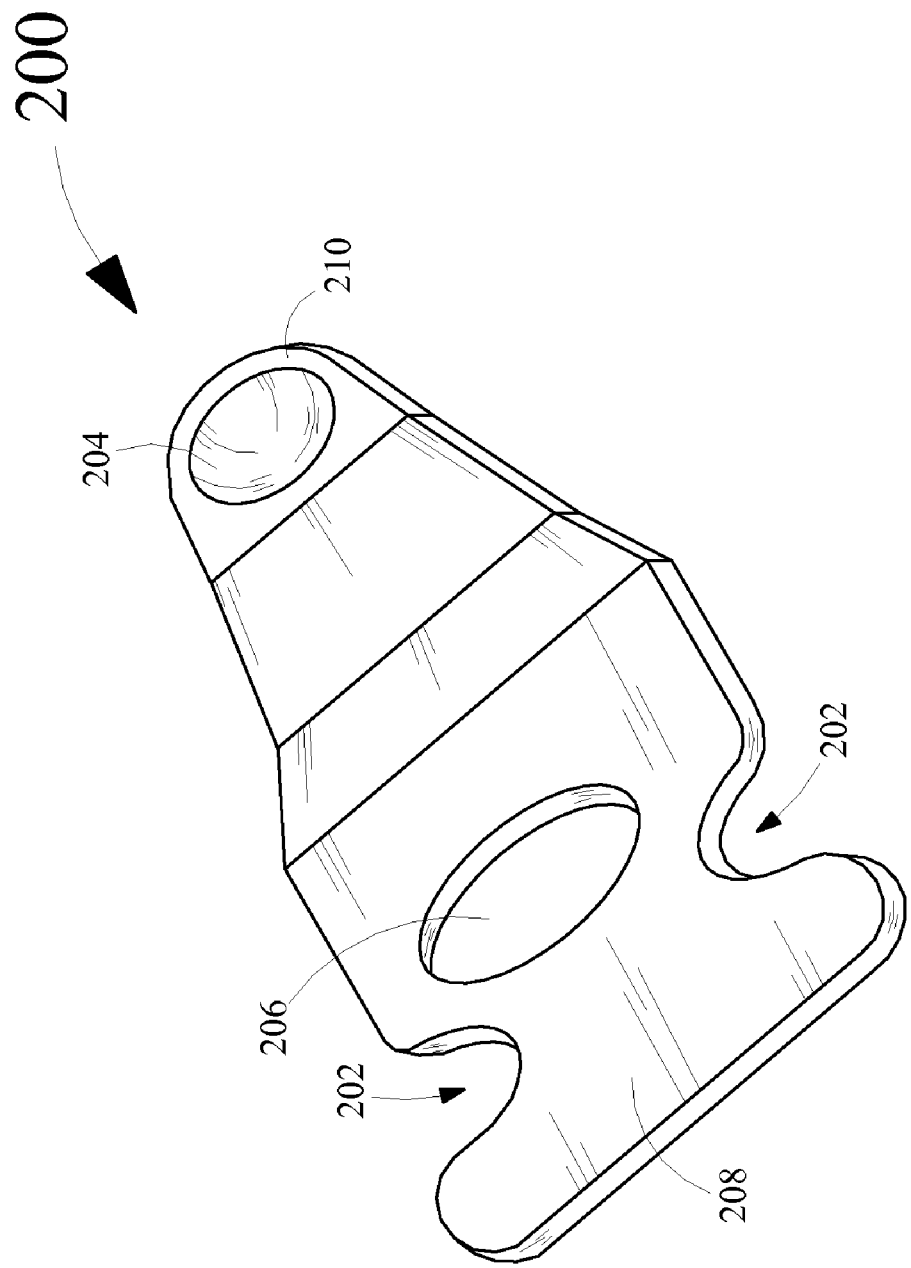
FIG. 4 depicts a perspective view of an urging member of the mounting assembly of FIG. 1, according to an exemplary embodiment of the present disclosure.

Urging member 200 is illustrated in FIG. 4, in accordance with an embodiment of the present disclosure. As described above, pair of urging members 200 may be used for securing end portions 3000a and 3000b of reflection mirror 3000 within the laser scanning unit (as depicted in FIGS. 1 and 2). Accordingly, references will be made to FIGS. 1 to 4 to describe urging member 200.

Urging member 200 includes a complementary pair of rotation control features 202, an impression 204, and a slot 206. Complementary pair of rotation control features 202 will hereinafter be referred to as "complementary control features 202". Complementary control features 202 are positioned along a first portion 208 of urging member 200 for being coupled with either of control features 120 or control features 134, depending on adaptability of urging member 200 either on second top surface 114 or second top surface 128. Specifically, complementary control features 202 are in the form of two notches positioned opposite to each other at first portion 208 of urging member 200.

Further, impression 204 of urging member 200 is defined on a second portion 210 opposite to first portion 208 of urging member 200 for urging either of end portion 3000a or end portion 3000b of reflection mirror 3000, depending on adaptability of urging member 200 either on second top surface 114 or second top surface 128. Furthermore, slot 206 of urging member 200 is positioned between first portion 208 and second portion 210 of urging member 200. Specifically, slot 206 is positioned adjacent and between complementary control features 202.

Referring further to FIGS. 1 to 4, reflection mirror 3000 is placed on first top surface 112 and first top surface 126. More particularly, end portions 3000a and 3000b of refection mirror 3000 are placed on first top surface 112 and first top surface 126, respectively. Upon placing reflection mirror 3000 on first top surface 112 and first top surface 126, barricading members 116a and 116b, and barricading members 130a and 130b, prevent reflection mirror 3000 from falling and/or slipping from first top surface 112 and first top surface 126. Further, the pair of urging members 200 is adapted to be secured on second top surface 114 and second top surface 128 for urging end portions 3000a and 3000b of reflection mirror 3000 on first top surface 112 and first top surface 126, such that first portion 210 of each urging member 200 is positioned substantially parallel to reflection mirror 3000 (as shown in FIGS. 1 and 2).

More particularly, complementary control features 202 of urging member 200 are configured for being coupled with control features 120 for enabling urging member 200 to be secured on second top surface 114. Further, such coupling enables cut-away area 118 of second support protrusion 110 and slot 206 to be aligned over each other for receiving screw member 300 therethrough. Similarly, complementary control features 202 of another urging member 200 are configured for being coupled with control features 134 for enabling urging member 200 to be secured on second top surface 128. Further, such coupling enables cut-away area 132 of second support protrusion 124 and slot 206 to be aligned over each other for receiving another screw member 300 therethrough.

When the pair of screw members 300 are received into the aligned cut-away areas 118 and 132 and through slots 206 and are tightened therein during assembly, the urging members 200 resist rotational movement due to the engagement of control features 202 of urging members 200 with control features 120, 134. As a result, urging members 200 are properly positioned over second top surface 114 and second top surface 128 such that first portions 208 of urging members 200 are in a position substantially parallel to reflection mirror 3000. Such positioning of urging members 200 substantially match with alignment of an angle of reflection mirror 3000 secured on first top surface 112 and first top surface 126. Further, the pair of screw members 300, upon being received into the aligned cut-away area 118 and slot 206, and the aligned cut-away area 132 and slot 206, are capable of configuring a point contact with the pair of urging members 200, as depicted in FIG. 5.

Figure 5:
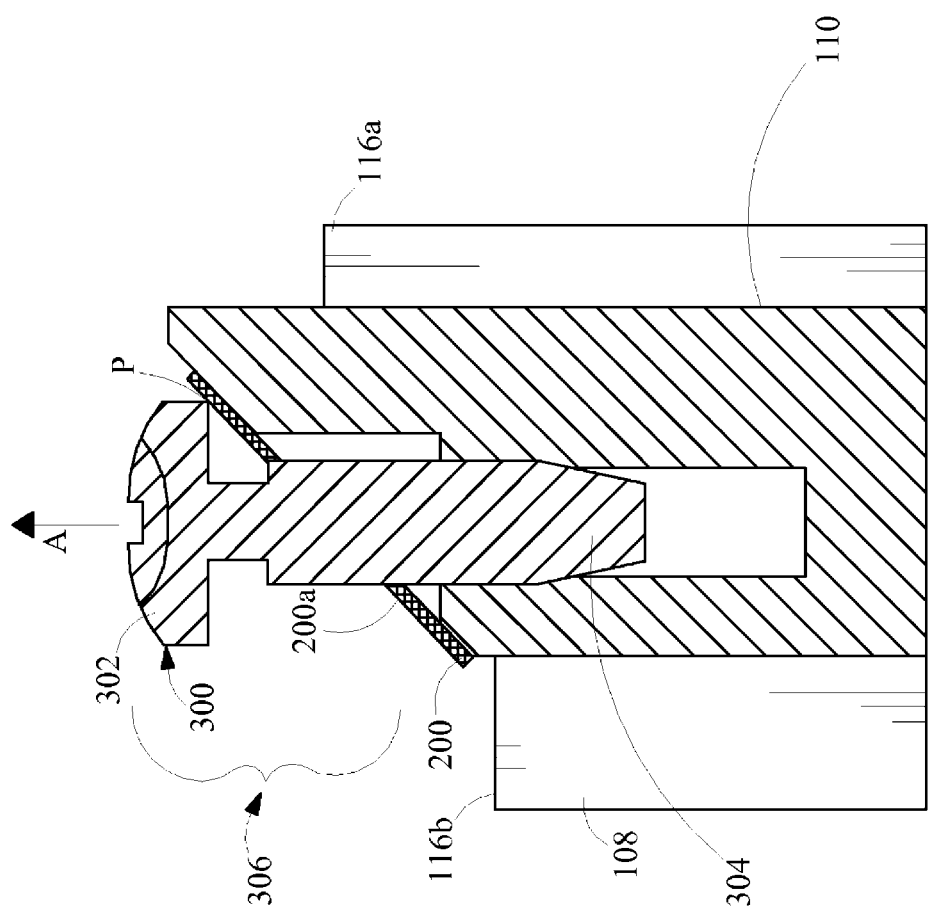
FIG. 5 depicts a cross sectional view of a portion of the mounting assembly of FIG. 1 taken along line X-X', according to an exemplary embodiment of the present disclosure.

Referring to FIG. 5, a sectional view of a portion of mounting assembly 2000 of FIG. 1 along an axis X-X' is illustrated, according to an embodiment of the present disclosure. As depicted in FIG. 5, a point contact P is made on a top surface 200a of first portion 208 of urging member 200 by a head portion 302 of screw member 300 when an elongated tail portion 304 of screw member 300 is threadingly engaged within second support protrusion 110 through the aligned cut-away area 118. Such an engagement of screw member 300 with urging member 200 while forming point contact P enables a portion 306 of screw member 300 to be left unengaged with the aligned cut-away area 118. Portion 306 of screw member 300 facilitates a user to firmly hold screw member 300 in order to pull-out screw member 300 from the aligned cut-away area 118 and slot 206 for disassembling urging member 200 and reflection mirror 3000 from mounting structure 100. Further, screw member 300 is capable of being pulled-out in a vertically perpendicular direction from the aligned cut-away area 118 and slot 206, specified by direction A, as shown in FIG. 5. The vertically perpendicular direction of the pull of screw member 300 facilitates the user to hold screw member 300 in order to pull-out screw member 300 for disassembling urging member 200 and reflection mirror 3000 from mounting structure 100 without requirement of additional tools, such as lifters.

In a similar manner as explained above, when another urging member 200 is secured over second top surface 128 of second support protrusion 124, a point contact, such as point contact P, is made on top surface 200a of urging member 200 by head portion 302 of another screw member 300 when elongated tail portion 304 of screw member 300 is threadingly engaged with second support protrusion 124 through the aligned cut-away area 132 and slot 206 of urging member 200. Accordingly, the description of disassembly of urging member 200 and reflection mirror 3000 from mounting structure 100 is not explained in conjunction with second support protrusion 124 of second pair of support protrusions 106, for the sake of brevity.

In use, the pair of urging members 200 secured on second top surface 114 of second support protrusion 110 and second top surface 128 of second support protrusion 124, extends therefrom towards reflection mirror 3000 placed on first top surface 112 of first support protrusion 108 and first top surface 126 of first support protrusion 122 (as depicted in FIGS. 1 and 2). Impressions, such as impression 204 on respective urging members 200, are capable of urging end portion 3000a and end portion 3000b of reflection mirror 3000 on first top surface 112 of first support protrusion 108, and first top surface 126 of first support protrusion 122, respectively. Specifically, the pair of screw members 300 provides downward force on respective urging members 200 when the pair of screw members 300 is inserted into respective aligned cut-away area 118 and slot 206, and aligned cut-away area 132 and slot 206, and threadingly engage with second support protrusions 110, 124. Accordingly, in turn, the pair of urging members 200 through respective impressions, such as impression 204, provide downward forces on reflection mirror 3000, thereby urging reflection mirror 3000 on mounting structure 100.

As explained hereinabove, configuration of mounting structure 100, and specifically, configuration of first top surface 112 and first top surface 126, and second top surface 114 and second top surface 128, at a specific angle that corresponds to the angle at which a reflection mirror, such as reflection mirror 3000, needs to be mounted, enables use of a pair of only a single type of urging member, such as urging member 200. Accordingly, the same pair of urging members 200 may be used for mounting reflection mirror 3000 at different angles, as per the requirement. Specifically, various mounting structures, such as mounting structure 100, with specific configurations in terms of configuration of first top surface 112 and first top surface 126, and second top surface 114 and second top surface 128 may be manufactured depending on mounting of reflection mirror 3000 at a desired angle, while using the same pair of urging members 200. Further, mounting structure 100 may be manufactured as per the shape and size of reflection mirror 3000 and the angle at which reflection mirror 3000 needs to be mounted.

For the purpose of the description, the pair of urging members 200 is composed of stainless steel. Further, the pair of screw members 300 is composed of electrodeposited zinc coated low-carbon steel. However, it will be evident to a person skilled in the art that the pair of urging members 200 and the pair of screw members 300 may be composed of any other material.

Moreover, for the purpose of this description, mounting structure 100 is composed of a glass-filled plastic material. Specifically, base member 102, first pair of support protrusions 104, and second pair of support protrusions 106 of mounting structure 100 are composed of the glass-filled plastic material. A suitable example of the glass-filled plastic material is NORYL® CN5246, which is composed of polyphenylene ether and polystyrene. However, it will be evident to a person skilled in the art that mounting structure 100 may be composed of any other material, such as CN5258.

The present disclosure provides a mounting assembly, such as mounting assembly 2000, to be employed within a laser scanning unit of a laser beam printer for mounting a reflection mirror, such as reflection mirror 3000, to deflect a scanned laser beam from a laser source to be incident onto a photoconductive medium. The mounting assembly is capable of mounting the reflection mirror into the laser scanning unit in an effective and easy-to-use manner. Further, the mounting assembly may be manufactured in a manner, such that the mounting assembly is capable of mounting the reflection mirror at various different angles within the laser scanning unit by using a pair of single type of urging members, such as pair of urging member 200. Furthermore, the reflection mirror may be mounted on a mounting structure, such as mounting structure 100, using the pair of urging members and a pair of screw members, such as pair of screw members 300, without having any deflection of the reflection mirror while fixing. Moreover, the reflection mirror is capable of being easily dismounted from within the laser scanning unit without involving use of any additional tools, such as lifters.

The foregoing description of several embodiments of the present disclosure has been presented for purposes of illustration. It is not intended to be exhaustive or to limit the present disclosure to the precise forms disclosed, and obviously many modifications and variations are possible in light of the above teaching. It is intended that the scope of the present disclosure be defined by the claims appended hereto.

What is claimed is:

1. A mounting assembly for mounting a reflection mirror within a laser scanning unit, the mounting assembly comprising:
   a mounting structure disposed on a portion of the laser scanning unit, the mounting structure comprising,
      a base member, a first pair of support protrusions extending from the base member, and a second pair of support protrusions disposed opposite to the first pair of support protrusions on the base member, each of the first pair of support protrusions and the second pair of support protrusions extending upwardly from the base member, each of the first pair of support protrusions and the second pair of support protrusions comprising,
  a first support protrusion having a first top surface, and
  a second support protrusion disposed adjacent to the first support protrusion, the second support protrusion having a second top surface, wherein the first top surface and the second top surface are disposed at a substantially identical predetermined angle relative to the base member, and wherein the first support protrusion is dimensioned for supporting an end portion of the reflection mirror on the first top surface; and
a pair of urging members, each urging member of the pair of urging members removably secured over the second top surface of one of the second support protrusions for urging a corresponding one of the end portions of the reflection mirror against a corresponding one of the first support protrusions such that at least one portion of each urging member is positioned substantially parallel to the reflection mirror.

2. The mounting assembly of claim 1 wherein the each urging member is composed of stainless steel.

3. The mounting assembly of claim 1 wherein the mounting structure is composed of a glass-filled plastic material.

4. The mounting assembly of claim 1, wherein for each pair of support protrusions, the first top surface of the first support protrusion lies in a first plane and the second top surface of the second support protrusion lies in a second plane that is substantially parallel to the first plane.

5. The mounting assembly of claim 1, wherein for each pair of support protrusions, the first top surface of the first support protrusion lies in a first plane and the second top surface of the second support protrusion lies in a second plane, the first and second planes being substantially parallel to a reflecting surface of the reflection mirror.

6. The mounting assembly of claim 1, further comprising a pair of screw members, wherein each second support protrusion includes an aperture extending from the second top surface of the second support protrusion towards the base member, wherein the each urging member comprises
  an impression disposed on the urging member for urging a corresponding end portion of the reflection mirror on a corresponding one of the first support protrusions and
  a slot defined through the urging member, wherein the slot and the aperture of the second support protrusion are aligned with each other for receiving a screw member therethrough,
  wherein each screw member threadingly engages with a distinct aperture of second support protrusion for securing the reflection mirror to the base member, when secured a head of each screw member contacts the corresponding urging member adjacent one portion of the slot and does not contact the urging member adjacent an opposed portion of the slot.

7. The mounting assembly of claim 6, wherein each screw forms a point contact with the corresponding urging member.

8. A mounting assembly for mounting a reflection mirror within a laser scanning unit, the mounting assembly comprising:
  a mounting structure disposed on a portion of the laser scanning unit, the mounting structure comprising,
    a base member,
    a first pair of support protrusions extending from the base member, and a second pair of support protrusions disposed opposite to the first pair of support protrusions on the base member, each of the first pair of support protrusions and the second pair of support protrusions extending upwardly from the base member, each of the first pair of support protrusions and the second pair of support protrusions comprising,
      a first support protrusion having a first top surface, and
      a second support protrusion disposed adjacent to the first support protrusion, the second support protrusion having a second top surface, wherein the first top surface and the second top surface are disposed at a predetermined angle relative to the base member, and wherein the first support protrusion is dimensioned for supporting an end portion of the reflection mirror on the first top surface; and
    a pair of urging members, each urging member of the pair of urging members removably secured over the second top surface of one of the second support protrusions for urging a corresponding one of the end portions of the reflection mirror against a corresponding one of the first support protrusions such that at least one portion of each urging member is positioned substantially parallel to the reflection mirror,
  wherein each second support protrusion comprises,
    a cut-away area extending from the second top surface of the second support protrusion towards the base member; and
    a pair of rotation control features disposed on and extending from the second top surface of the second support protrusion.

9. The mounting assembly of claim 8 wherein the each urging member comprises,
  a complementary pair of control features disposed at a first portion of the each urging member for being coupled with the pair of rotation control features;
  an impression disposed on a second portion opposite to the first portion of the urging member for urging the corresponding end portion of the reflection mirror on the corresponding one of the first support protrusions; and
  a slot disposed between the first portion and the second portion, wherein the slot and the cut-away area of the second support protrusion are aligned with each other for receiving a screw member therethrough, when the complementary pair of control features engage with the pair of rotation control features.

10. The mounting assembly of claim 9 wherein the screw member forms a point contact with the urging member for retaining the urging member on the second top surface of the second support protrusion.

11. The mounting assembly of claim 9 wherein the screw member is composed of electrodeposited zinc coated low-carbon steel.

12. A laser scan unit of a laser printing device, comprising:
  a base member;
  a reflecting member;
  a pair of first support members disposed on a surface of the base member along opposed end portions thereof, the first support members supporting the reflecting member such that a reflecting surface of the reflecting member is disposed at a predetermined angle relative to the surface of the base member;

a pair of second support members disposed on the surface of the base member, each second support member being disposed proximally to a distinct first support member and having a surface positioned at the predetermined angle relative to the surface of the base member;

a pair of urging members for securing the reflecting member to the first support members, each urging member including a first portion which selectively engages with and is disposed against the surface of a distinct second support member and a second portion which secures the reflecting member against one of the first support members, at least one of the first and second portions of the urging member being substantially in parallel with the reflecting surface of the reflecting member; and a pair of securement members engaging with the second support members for selectively securing the urging members against the second support members so as to stably secure the reflecting surface of the reflecting member at the predetermined angle.

13. The laser scan unit of claim 12, wherein each second support member includes one or more tab members which protrude from the surface of the second support member, and each urging member includes one or more notches defined in the first portion thereof, the one or more tab members engaging with the one or more notches when the urging member is engaged with the second support member.

14. The laser scan unit of claim 12, wherein each securement member comprises a screw and each second support member includes a hole defined therein and extending from the surface thereof, the hole including an upper portion and a lower portion having a smaller diameter than the upper portion and including a threaded inner surface for threadingly engaging with one of the screws.

15. The laser scan unit of claim 14, wherein each urging member further includes a slot defined through the first portion thereof, the slot being aligned with the hole when the urging member is engaged with the second support member.

16. The laser scan unit of claim 12, wherein each urging member includes a dimple defined in the second portion thereof which contacts the reflecting member when the urging member is engaged with the second support member.

17. The laser scan unit of claim 12, wherein the first and second support members are composed of a glass filled plastic.

18. The laser scan unit of claim 12, wherein the urging members are constructed from stainless steel.

19. The laser scan unit of claim 12, wherein each first support member includes a surface that is positioned at the predetermined angle relative to the surface of the base member and sized for supporting an end portion of the reflecting member, and stops disposed at opposed ends of the surface of the first support member for substantially stably positioning the end portion of the reflecting member.

20. The laser scan unit of claim 12, wherein the securement members form a point contact with the urging members.

21. The laser scan unit of claim 12, wherein each second support member includes an aperture defined from the surface thereof, each urging member includes a slot defined therethrough, and each securement member includes a head which contacts a corresponding urging member adjacent one portion of the slot and does not contact the corresponding urging member adjacent an opposed portion of the slot.

22. The laser scan unit of claim 21, wherein the head of each securement member forms a point contact with the corresponding urging member.

23. The laser scan unit of claim 12, wherein each first support member includes an outer surface against which the reflecting member is disposed, and wherein the outer surface of each first support member lies in a first plane and the surface of each second support member lies in a second plane substantially parallel to the first plane.

24. The laser scan unit of claim 12 wherein each second support member comprises a cut-away area extending from the surface of the second support member towards the base member; and a pair of rotation control features disposed on and extending from the surface of the second support member.

25. The laser scan unit of claim 24, wherein each urging member comprises:
a complementary pair of control features disposed at a first portion of the each urging member for being coupled with the pair of rotation control features;
an impression disposed on a second portion opposite to the first portion of the urging member for urging the corresponding end portion of the reflection member on the corresponding one of the first support members; and
a slot disposed between the first portion and the second portion, wherein the slot and the cut-away area of the second support member are aligned with each other for receiving a screw member therethrough, when the complementary pair of control features engage with the pair of rotation control features.

* * * * *